70. LOCKS,
316

29

NO PRINTED SPECIFICATION AVAILABLE. EXAMINERS' ROOM.

BEST AVAILABLE COPY

H. W. Covert,

Permutation Lock.

No. 222. Patented Mar. 1, 1859.

Reissued 18,228

Fig 1

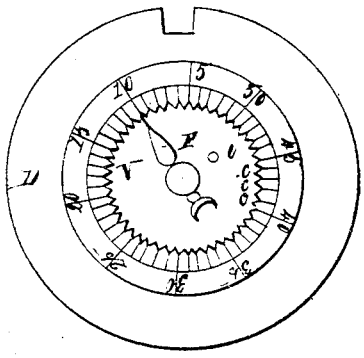

Fig 2. Fig 3.

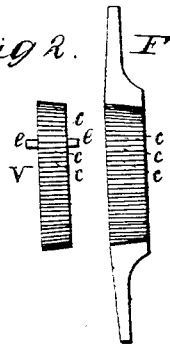

Witnesses.

Martin Briggs

H. Saunter

Inventor

Henry W. Covert

No. 222, to original Letters Patent No. 18,228.—*Improvement in Locks.*—I claim the combination of the disk D and centre V, toothed or corrugated, substantially as represented, for the purpose of fastening them securely together, but I do not confine myself to any particular size or shape or number of teeth, nor to any particular position on the disk or centre.

HENRY W. COVERT.

N. PETERS, PHOTO-LITHOGRAPHER, WASHINGTON, D. C.